US008661460B2

(12) United States Patent
Newell et al.

(10) Patent No.: US 8,661,460 B2
(45) Date of Patent: *Feb. 25, 2014

(54) SYSTEM FOR CONTROLLING USE OF BROADCAST CONTENT

(75) Inventors: Donald K. Newell, Portland, OR (US);
David W. Doerner, Beaverton, OR (US);
Rajiv Choudhary, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/609,449

(22) Filed: Sep. 11, 2012

(65) Prior Publication Data

US 2013/0007783 A1    Jan. 3, 2013

Related U.S. Application Data

(63) Continuation of application No. 09/474,783, filed on Dec. 30, 1999, now Pat. No. 8,291,444.

(51) Int. Cl.
*H04N 7/16* (2011.01)
(52) U.S. Cl.
USPC ................................................. 725/2; 725/8
(58) Field of Classification Search
USPC ........... 725/1–8, 86–104, 131–134, 139–142, 725/151–153; 709/217–232
See application file for complete search history.

(56) References Cited

U.S. PATENT DOCUMENTS

| 4,930,158 | A | | 5/1990 | Vogel |
| 4,945,563 | A | | 7/1990 | Horton et al. |
| 5,214,694 | A | * | 5/1993 | Furuya et al. ................... 380/2 |
| 5,563,648 | A | | 10/1996 | Menand et al. |
| 5,619,247 | A | | 4/1997 | Russo |
| 5,654,747 | A | | 8/1997 | Ottesen et al. |
| 5,721,815 | A | | 2/1998 | Ottesen et al. |
| 5,767,893 | A | | 6/1998 | Chen et al. |
| 5,796,828 | A | | 8/1998 | Tsukamoto et al. |
| 5,987,518 | A | | 11/1999 | Gotwald |
| 6,067,564 | A | | 5/2000 | Urakoshi et al. |
| 6,240,401 | B1 | | 5/2001 | Oren et al. |
| 6,523,113 | B1 | | 2/2003 | Wehrenberg |
| 6,751,221 | B1 | | 6/2004 | Saito et al. |
| 6,785,733 | B1 | | 8/2004 | Mimura et al. |

* cited by examiner

*Primary Examiner* — Annan Shang
(74) *Attorney, Agent, or Firm* — Kacvinsky Daisak PLLC

(57) ABSTRACT

A system for controlling use of broadcast content is described. In accordance with a particular implementation, the system includes a receiver in communication with a source of broadcast content. The receiver also includes, or is coupled to, a playback device. The receiver is configured to control the use of received broadcast content through the playback device in accordance with control information embedded in the broadcast content.

20 Claims, 3 Drawing Sheets

SYSTEM FOR CONTROLLING USE OF BROADCAST CONTENT

FIELD OF THE INVENTION

The present invention relates generally to the field of broadcast television, and in particular to system for controlling use of broadcast content.

BACKGROUND OF THE INVENTION

Numerous broadcast environments are being defined and developed for delivering a combination of television and ancillary data services to recipients. Such broadcast environments include, for example, digital broadcast standards defined by the Advanced Television Systems Committee (ATSC) and the Digital Video Broadcasting (DVB) group for digital television in Europe, the United States, and elsewhere throughout the world. One contemplated use of such broadcasts is to concurrently transmit content for television shows (e.g., audio and video content embodied in MPEG-format signals) and other digital content (e.g., electronic magazines, HTML pages, subscription content). Other digital transmission environments, such as the Internet, are also becoming capable of effectively delivering high-quality audiovisual material in conjunction with other content. Yet another way in which such enriched content can be provided is through VBI (vertical blanking interval) over analog television signals.

This trend towards enriched broadcast content has raised significant issues relating to, for example, unauthorized copying and/or distribution of video content, and fair compensation of content providers commensurate with use. These issues are similar to those faced by providers of DVDs (digital versatile discs), which have become a popular alternative to videotapes for in-home movies. One approach to addressing at least some of these issues was attempted in connection with the now-defunct Divx/DVD platform developed by Digital Video Express, LP of Herndon, Va. The Divx approach involved the use of an enhanced DVD player and an enhanced DVD. The player included a modem for communicating billing information to a Divx host computer and a secure memory chip used to decrypt Divx movies. Each Divx disc included an individualized serial number which the player read and stored the first time the disc was inserted. Information stored on the disc and in the player was then used to determine the appropriate price for the movie. When the customer began playing a movie, the viewing period for that copy of the movie also began. More specifically, the player allowed the properly-identified disc to be played for a set length of time (which was also stored in secure memory on the player). During this set period of time, the disc was completely "unlocked," allowing the customer to view the content as many times as desired. The modem was used to call the Divx host computer on a regular schedule for billing purposes, and then to refresh billing information maintained by the player. If the player was unable to contact the host computer for any reason (e.g., communications problems), the player would prevent further playback after a predetermined period of time to avoid additional charges that might go unpaid.

Although the Divx approach addressed certain control issues with respect to directly-distributed digital content provided on DVDs, there is currently no system for providing comparable protections and features in connection with broadcast content.

SUMMARY OF THE INVENTION

The present invention relates to a system for controlling use of broadcast content. In accordance with a particular embodiment, the system includes a receiver in communication with a source of broadcast content. The receiver includes, or is coupled to, a playback device. The receiver is configured to control the use of received broadcast content through the playback device in accordance with control information embedded in the broadcast content.

DETAILED DESCRIPTION

The present invention relates to a system for controlling use of broadcast content. In accordance with particular embodiments described herein, a system is provided for implementing "pay-per-use" television broadcasts, wherein television shows and other content can be provided in such a way that a user is charged only when the content is viewed or otherwise consumed. This is in contrast to existing pay-per-view (PPV) arrangements, where programming is typically only authorized for viewing during the time of broadcast.

Figure 1:
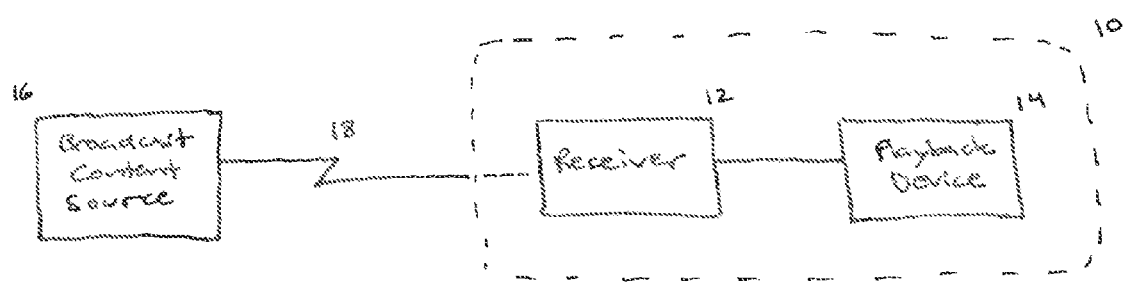
FIG. 1 is a block diagram showing a system for controlling use of broadcast content in accordance with an embodiment of the present invention.

Referring now to FIG. 1, in accordance with a first embodiment of the present invention a system 10 for controlling use of broadcast content includes a receiver 12 in communication with a broadcast content source 16. Receiver 12 is coupled to a playback device 14. As shown, broadcast content source 16 transmits a broadcast stream 18 that is received by receiver 12.

In this embodiment, broadcast stream 18 comprises a substantially continuous stream of digital data which may or may not be interspersed with other types of information. In one particular implementation, broadcast stream 18 comprises an analog television signal with digital data interspersed therein using, for example, VBI techniques known in the art. Alternatively, broadcast stream 18 may comprise digital content transmitted by broadcast content source 16 in accordance with any of a large number of well-known protocols, including but not limited to MPEG2 and IP (Internet Protocol). In such an implementation, digital content can be transmitted as encapsulated data, such as IP data included within (i.e., "tunneled" within) private sections of an MPEG2 data stream, or the digital content can be transmitted as a native type on an MPEG2 transport stream using, for example, well-known protocols in the MPEG family of standards such as DSM-CC Download Protocol, Data Carousel, and Object Carousel. Such transmission techniques are well known in the art, and the present invention is not intended to be limited to any particular transmission technique or communications protocol.

Still referring to the embodiment illustrated in FIG. 1, broadcast content source 16 may be a facility operated by an originator of the digital content transmitted within broadcast stream 18, or may be a facility operated by an entity transmitting digital content obtained from a content provider (not shown). Both scenarios are commonplace, and the present invention is not intended to be limited in this regard.

In accordance with the embodiment shown in FIG. 1, broadcast stream 18 includes descriptive information (not shown), called a "descriptor," which defines the manner in which the digital content included in broadcast stream 18 may be used. For example, as is discussed further below, the descriptor may define whether a television show, a movie, or other digital content within broadcast stream 18 can be recorded for viewing at some later time. Likewise, the descriptor can include information relating to the number of times that the digital content may be viewed, the cost for viewing (e.g., on a per-viewing basis), and how long the digital content may be viewed (e.g., a predefined length of time, a date range). In this particular embodiment, receiver 12 interprets and acts upon the information carried in the descriptor. In other embodiments, it is possible to configure playback device 14 or some other component of system 10 to perform some or all of the functionality of receiver 12 with respect to processing the descriptor. Likewise, it is possible to configure receiver 12 or such other components to include defaults with respect to authorized uses of digital content that will be applied in the event that broadcast stream 18 either lacks a descriptor or includes invalid/insufficient descriptive information.

Still looking at the embodiment in FIG. 1, receiver 12 can be implemented on a high-powered, CPU-driven platform that includes appropriate hardware and software for processing broadcast stream 18, and particularly any descriptor or similar authorization information included therein. Alternatively, receiver 12 may comprise, for example, a specially-configured converter box of the type commonly used in connection with cable or satellite television systems. Indeed, there is a broad spectrum of devices suitable for use as receiver 12 depending, for example, on the level of functionality and processing capability required for any particular implementation. Again, the present invention is not intended to be limited in this regard.

As note above, logic in receiver 12 interprets and acts upon the descriptor in broadcast stream 18, determining, for example, whether digital content can be stored for display and charge-back at some later time. Through its connection to playback device 14, receiver 12 is also able to determine when recorded content is played back or otherwise consumed, and includes a mechanism for remunerating the content provider (e.g., the administrator of broadcast content source 16). In accordance with particular implementations, receiver 12 may be adapted to ensure that content can only be played or consumed on the particular system 10 which received and recorded the content, thereby providing protection against unauthorized copying and use.

Still referring to FIG. 1, playback device 14 can be any device capable of rendering digital information. Where the digital content including in broadcast stream 18 comprises audiovisual content, such as a television show or a movie, playback device 14 may be a standard DVD player, a digital VCR (videocassette recorder) or a digital VCP (videocassette player) connected to a television or a video monitor. Alternatively, playback device 14 can be a computer monitor with associated driver software.

Persons skilled in the art will further recognize that playback device 14 can simply be an output device for rendering digital content, or it can include logic for performing additional functions, including but not limited to functions related to payment for viewing or otherwise consuming digital content. Moreover, it will be appreciated that playback device 14 may be a stand-alone component, or may be incorporated into receiver 12. Such considerations are merely implementation details, and the present invention is intended to encompass all possible configurations.

Figure 2:
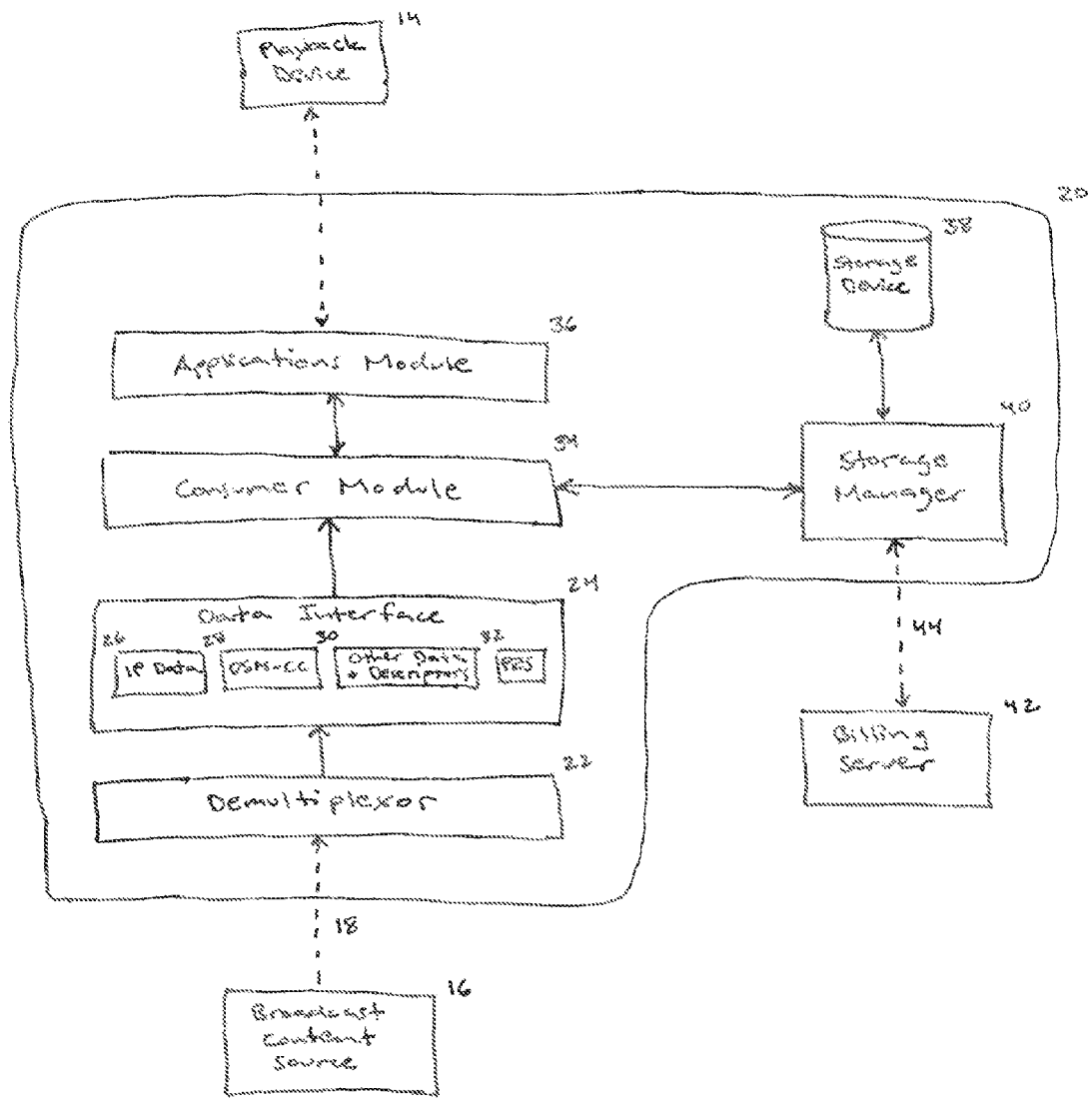
FIG. 2 is a block diagram illustrating a particular implementation of a receiver suitable for use in connection with the embodiment shown in FIG. 1.

FIG. 2 illustrates in block diagram form a receiver of the type suitable for use in connection with the embodiment shown in FIG. 1. In this example, receiver 20 is implemented using a standard personal computer, although many other types of devices could be used as discussed above. As illustrated, receiver 20 includes a demultiplexor 22 configured to receive broadcast stream 18 from broadcast content source 16 (as described above). Demultiplexor 22 is responsible for initial processing of broadcast stream 18, performing high-level validity checks and determining the nature (e.g., transmission protocol) of the received digital content. Demultiplexor 22 may also be configured to buffer portions of broadcast stream 18 to enable further processing in blocks of data having a predetermined size.

Demultiplexor 20 forwards blocks of data extracted from broadcast stream 18 to a data interface 24 that is configured to perform datatype-specific processing. To facilitate such processing, demultiplexor 20 may attach a header to the blocks of data including such information as the datatype for the block and its length. Data interface 24 is responsible for identifying and extracting relevant data (e.g., the non-audiovisual components) from broadcast stream 18. To this end, data interface 24 includes datatype-specific submodules for the various datatypes that it is configured to process. In this particular implementation, data interface 24 includes an IP Data module 26, a DSM-CC Data module 28, and a PES (packetized elementary stream) Data module 32. In addition, data interface 24 includes a general Other Data and Descriptors module 30. This latter module is configured to process any descriptor or other authorization information included in broadcast stream 18, as discussed above, as well as any datatypes for which data interface 24 has no datatype-specific processing module.

Data interface 24 passes the data that it processes to a consumer module 34 coupled thereto. In the implementation illustrated in FIG. 2, consumer module 34 is configured to perform the majority of the processing relating to controlling the use of content transmitted in broadcast stream 18. To this end, consumer module 34 includes logic for interpreting and acting upon the descriptor or similar information passed to it by data interface 24. Consumer module 34 may, for example, interpret the descriptor to determine whether storage of particular content for later consumption is permitted, in which case consumer module 34 would pass such content to storage manager 40. In an alternative implementation, demultiplexor 22 may be configured to perform certain authorization processing, such that only data which may be recorded is passed to consumer module 34. In addition to passing data to storage manager 40, consumer module 34 manages consumption of the content and handles any required processing for remuneration to the provider of the content. To this end, as is discussed further below, consumer module 34 is coupled to playback device 14 (through applications module 36) and to an external billing server 42 (through storage manager 40).

In the particular implementation shown in FIG. 2, consumer module 34 is configured essentially as a control module, with particular functionality being performed by other modules in communication with consumer module 34. For example, as noted above, functionality relating to storage and retrieval of digital content is substantially performed by storage manager 40. Likewise, functionality related to consumption and billing is substantially performed by applications module 36, which would itself typically comprise a plurality of submodules. However, persons skilled in the art will recognize that these are simply design details, since the functionality provided by any particular module of receiver 20 could readily be combined with that performed by any other module. The present invention is therefore not intended to be limited to any particular design or arrangement of functional units.

Looking more closely at receiver 20 in FIG. 2, storage manager 40 is coupled to a storage device 38. Storage device 38 may be implemented using any device capable of supporting storage and retrieval of digital data. For example, storage device 38 may be a hard drive installed in a computer in which receiver 20 is implemented or, alternatively, a stand-alone disk drive or other memory in communication with receiver 20. Alternatively, storage device 38 can be some other type of remote device, such as a writeable DVD, VCR, or tape machine. In such a case, storage device 38 could be a component of playback device 14.

Still referring to the example in FIG. 2, consumer module 34 and storage manager 40 are configured to provide certain protections against unauthorized uses of content stored in storage device 38. To this end, consumer module 34 provides storage manager 40 with control information to be included with the stored content that defines the actions that should be taken when the content is later retrieved for playback. Such control information might include, for example, indicators that will cause applications module 36 to track the length of time of consumption on playback device 14 and, depending upon the descriptor information associated with any particular content, prevent consumption beyond some predetermined length of time. For instance, a provider of broadcast content, such as a movie, may wish to permit viewing only for a period of time equivalent to some number of end-to-end viewings of the movie.

Similarly, playback information tracked by applications module 36 can be used by consumer module 34 to determine a price to be paid by a consumer for consumption of the stored content. To this end, consumer module 34 can be configured to calculate a cost for an anticipated or completed consumption and communicate such information to a consumer through, for example, playback device 14 or some other user interface, such as a monitor or display associated with receiver 20. Consumer module 34 can also be configured to secure any necessary payment for such consumption using any of a variety of known methods for automated payment. Included among such methods are charging to a credit card or providing authorization to withdraw payments from a specified bank account. For such purposes, receiver 20 can communicate with billing server 42 through an external network connection 44. Network connection 44 may comprise, for example, an Internet connection or a connection to a cable operator of the type used for cable-based Internet access, and can be used to exchange billing information and approvals between receiver 20 and billing server 42.

As an alternative to such payment methods, it is possible to use so-called "smart cards," whereby the smart card permits its holder to debit a predetermined amount of money corresponding to the cost of any given consumption activities. In accordance with such an arrangement, for example, a provider of broadcast content can sell a smart card to a consumer, either in conjunction with or separate from the provision of content, and the consumer would then be able to debit the cost for subsequent consumption(s) of stored broadcast content from the value of the card. In support of such an arrangement, receiver 20 or playback device 14 could be configured with a device capable of reading/updating the value stored on the smart card. Alternatively, a similar type of arrangement could be implemented through software (i.e., a "virtual smart card"), thereby eliminating the need for physical cards and associated equipment.

In accordance with another variation on the embodiments described above, consumer module 34 can be configured to provide additional protections against unauthorized use of recorded content through the use of known encryption and certification techniques. For example, content to be stored in storage device 38 for later consumption can be encrypted such that it can only be decrypted for playback by a viewing or consuming device that is configured to present appropriate authorization credentials. Such an approach would protect against an authorized consumer making copies of the content recorded on storage device 38 and then distributing such copies to unauthorized consumers. Similar encryption techniques can be used to ensure that the recorded content can only be played back using a device containing a specified CPU. For instance, an identifier for a CPU in receiver 20 can be specified in header information stored with the broadcast content in storage device 38. Using appropriate techniques, the content can be encrypted and recorded in a way that prevents decryption by any device other than the one having the specified CPU.

Figure 3:
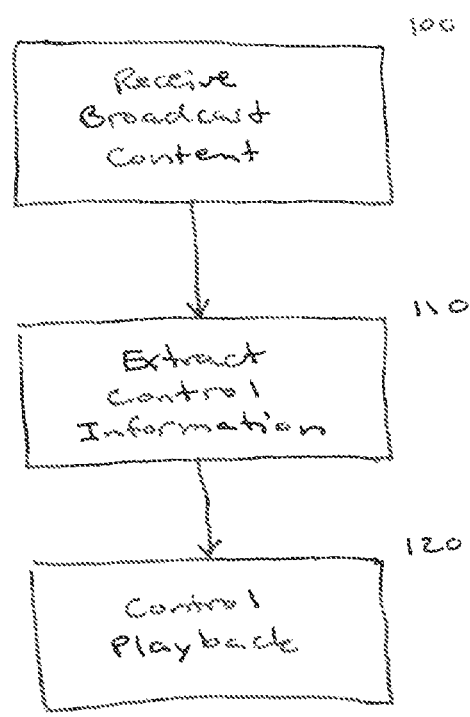
FIG. 3 is a flow diagram showing a general method for controlling use of broadcast content in accordance with an embodiment of the present invention.

By way of further illustration, FIG. 3 presents a flow diagram describing a general method for controlling the use of broadcast content in accordance with another embodiment of the present invention. Such a method may be performed, for example, using the structures illustrated in FIGS. 1 and 2 above. As shown, the method involves receiving broadcast content (Step 100), extracting control information from the received broadcast content (Step 110), and controlling playback of the broadcast content in accordance with the extracted control information (Step 120). Consistent with the discussion set forth above, such a method can be modified to include a step of storing the received broadcast content. Such a step would typically, though not necessarily, be performed after the extraction of control information to permit a determination of whether recording is authorized. Likewise, such a method could include steps such as determining the cost for displaying or otherwise consuming the recorded material, and determining how that cost will be charged.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

In view of the descriptions set forth above, it will be appreciated that embodiments of the present invention can advantageously be applied to enable consumers to record pay-per-view (PPV) broadcast material for viewing at their convenience. With such embodiments, consumers can record broadcast material, such as PPV television specials, concerts, or sports events, and then pay only if and when they watch the material. As an added benefit, such embodiments permit consumers to have access to VCR-type features (e.g., pause, rewind, fast forward) when viewing PPV material. Likewise, embodiments of the present invention, if widely implemented, would allow broadcasters more flexibility in offering PPV selections. In effect, broadcasters gain access to more screens for presentation of PPV selections (i.e., by virtue of multiple playback/payment opportunities), thereby offering marginal revenue increases.

The foregoing is a detailed description of particular embodiments of the claimed invention. However, the claimed invention also embraces all alternatives, modifications and variations that fall within the letter and spirit of the appended claims, as well as all equivalents of the claimed subject matter. For example, the embodiments described above are not limited to application solely with television broadcast content, but can instead be readily extended to other forms of digital content distribution. As just one example, such embodiments can be used to apply pay-per-use functionality to music distributed in digital form over the Internet (e.g., in MP3 format). Similarly, such embodiments could be applied to the distribution of books or other literary material over the Internet. Persons skilled in the art will recognize that many other alternatives, modifications and variations are also possible.

What is claimed:

1. A system comprising a receiver in communication with a source of broadcast content and coupled to a playback device and a storage device, the receiver to control the use of received broadcast content through the playback device and the storage device in accordance with a descriptor embedded in the received broadcast content, the descriptor to indicate whether the storage device may store the received broadcast content prior to viewing and without reproducing the received broadcast content, the storage device operable by the receiver to store the received broadcast content without requiring payment for the received broadcast content unless and until the received broadcast content is retrieved from the storage device and consumed on the playback device, the stored broadcast content encrypted such that it can be decrypted for playback by the playback device comprising a central processing unit when the central processing unit is specified in header information stored with the stored broadcast content.

2. The system of claim 1, the receiver operative to maintain information relating to the use of the received broadcast content through the playback device.

3. The system of claim 2, the receiver operative to use the information relating to the use of the received broadcast content for remuneration of a provider of the broadcast content.

4. The system of claim 3, the receiver operative to debit a cost for consumption of the broadcast content from a value stored on a smart card or virtual smart card.

5. The system of claim 2, the information relating to the use of the received broadcast content comprising a duration of use.

6. The system of claim 2, the information relating to the use of the received broadcast content comprising a number of times that the playback device may reproduce the received broadcast content.

7. A method comprising:
receiving broadcast content;
extracting a descriptor embedded in the received broadcast content, the descriptor to indicate whether the received broadcast content may be stored prior to viewing and without reproducing the received broadcast content;
storing the received broadcast content without requiring payment for the received broadcast content unless and until the received broadcast content is retrieved from the storage device and consumed on the playback device, the stored broadcast content encrypted such that it can be decrypted for playback by a playback device comprising a central processing unit when the central processing unit is specified in header information stored with the stored broadcast content; and
controlling use of the received broadcast content in accordance with the extracted descriptor.

8. The method of claim 7, the descriptor indicating a number of times that the received broadcast content may be reproduced.

9. The method of claim 7, the descriptor indicating a length of time that the received broadcast content may be reproduced.

10. The method of claim 9, the length of time comprising a date range.

11. The method of claim 7, the extracted descriptor indicating a cost for consumption of the broadcast content.

12. The method of claim 11, comprising debiting the cost for consumption of the broadcast content from a value stored on a smart card or virtual smart card.

13. The method of claim 7, the controlling use comprising preventing use of the broadcast content other than as specified by the extracted descriptor.

14. The method of claim 7, comprising obtaining payment information from a user of the received broadcast content.

15. A non-transitory computer-readable storage medium having stored thereon a set of executable instructions that when executed by a computer system perform a method comprising:
receiving broadcast content;
extracting a descriptor embedded in the received broadcast content, the descriptor to indicate whether the received broadcast content may be stored prior to viewing and without reproducing the received broadcast content;
storing the received broadcast content without requiring payment for the received broadcast content unless and until the received broadcast content is retrieved from the storage device and consumed on the playback device, the stored broadcast content encrypted such that it can be decrypted for playback by a playback device comprising a central processing unit when the central processing unit is specified in header information stored with the stored broadcast content; and
controlling use of the received broadcast content in accordance with the extracted descriptor.

16. The computer-readable storage medium of claim 15, comprising instructions that when executed by the computer system cause the computer system to debiting a cost for consumption of the broadcast content from a value stored on a smart card or virtual smart card.

17. The computer-readable storage medium of claim 15, the descriptor indicating a length of time that the received broadcast content may be reproduced.

18. The computer-readable storage medium of claim 15, the descriptor indicating a number of times that the received broadcast content may be reproduced.

19. The computer-readable storage medium of claim 15, the storage medium comprising a memory accessible by a computer.

20. The computer-readable storage medium of claim 15, the storage medium comprising a portable storage device.

* * * * *